United States Patent [19]
Suzue et al.

[11] Patent Number: 5,686,155
[45] Date of Patent: Nov. 11, 1997

[54] HOLLOW CYLINDRICAL MEMBER

[75] Inventors: Hiroyasu Suzue; Yuichi Aizawa, both of Tokyo, Japan

[73] Assignee: Daiwa Seiko, Inc., Tokyo, Japan

[21] Appl. No.: 461,308

[22] Filed: Jun. 5, 1995

Related U.S. Application Data

[62] Division of Ser. No. 312,929, Sep. 30, 1994.

[30] Foreign Application Priority Data

Oct. 29, 1991 [JP] Japan ................... 3-283134
Nov. 29, 1991 [JP] Japan ................... 3-105675

[51] Int. Cl.⁶ .................... B32B 1/08; B32B 5/12
[52] U.S. Cl. .............. 428/34.5; 428/34.7; 428/36.1; 428/36.3; 428/298.1; 428/300.7; 442/231; 442/234; 442/236; 442/262; 442/265; 442/266
[58] Field of Search .................. 428/34.5, 34.7, 428/36.1, 36.2, 36.3, 295.4, 297.1, 298.1, 300.7; 442/231, 234, 236, 262, 265, 266

[56] References Cited

U.S. PATENT DOCUMENTS

| | | |
|---|---|---|
| 4,023,801 | 5/1977 | VanAuken ................. 428/34.5 X |
| 4,343,843 | 8/1982 | Johnson et al. . |
| 4,675,221 | 6/1987 | Lalikos et al. . |
| 4,733,800 | 3/1988 | Bjorkengren et al. . |
| 5,028,464 | 7/1991 | Shigetoh . |
| 5,049,422 | 9/1991 | Honma . |
| 5,156,396 | 10/1992 | Akatsuka et al. . |
| 5,385,767 | 1/1995 | Noguchi ................. 428/36.91 |

FOREIGN PATENT DOCUMENTS

| | | |
|---|---|---|
| 63-169804 | 12/1988 | Japan . |
| 2-9876 | 4/1990 | Japan . |
| 3-61030 | 3/1991 | Japan . |

*Primary Examiner*—Marion E. McCamish
*Assistant Examiner*—Blaine R. Copenheaver
*Attorney, Agent, or Firm*—Longacre & White

[57] ABSTRACT

A main body of a hollow cylindrical member is formed of a wound preimpregnation sheet made of reinforcing fibers impregnated with synthetic resins. A synthetic resins layer with a metallic member is provided onto an outer periphery of the main body for reinforcing and/or decorative property. The metallic member is in the form of a thin film bonded to an outer periphery of the synthetic resins layer or a net-like metallic member embedded in the layer.

8 Claims, 3 Drawing Sheets

HOLLOW CYLINDRICAL MEMBER

This application is a divisional of U.S. Ser. No. 08/312,929, filed Sep. 30, 1994, now abandoned.

BACKGROUND OF THE INVENTION

The present invention relates to a hollow cylindrical member mainly made of synthetic resins, and more particularly to a hollow cylindrical member which contains a metallic material in the synthetic resins for reinforcing property and/or decorative property and which is applicable to a golf club shaft, a fishing rod, a bicycle frame, a ski stock or the like.

Japanese Patent Unexamined Publication No. Hei. 3-61030 discloses a hollow cylindrical member which is formed of a wound preimpregnation material sheet made of high-strength fibers impregnated with synthetic resins and which is provided with a reinforcing metal layer on an outer surface of the hollow cylindrical member.

In the disclosed hollow cylindrical member, a metal wire to which thread having good bonding property with matrix is wound, is spirally or twillingly wound onto a laminated main body of the wound preimpregnation material sheets in order to enhance the strength of the hollow cylindrical member and to attain close bonding between component parts.

However, the hollow cylindrical member has a disadvantage in that in spite of exhibiting large irregular portions, i.e. projections or recesses due to the provision of the metallic wire, exposed portions of the laminated main body becomes still large in area, so that these exposed portions are likely to be cracked, damaged, worn out and broken.

Further, the metallic wire has many projecting portions and the contact area between the metallic wire and the laminated main body is small, so that the metallic wire is likely to be peeled off from the laminated main body even if the material having good bonding property is provided around the metallic wire.

Japanese Patent Unexamined Publication No. Hei. 2-98376 discloses another type of a hollow cylindrical member which is formed by laminating fiber-reinforced resins and which contains therein a metallic layer in order to enhance decorative value, surface hardness and impact-resistance of a golf club shaft.

In the disclosed hollow cylindrical member, a preimpregnation material sheet utilizing a woven fabric as a reinforcing material and having a thin metallic film applied to one side surface thereof, is wound onto an inner layer such that the metallic film is disposed at the inside of the hollow cylindrical member, so that the metallic film is obstructed by fiber-intersecting points of the reinforcing woven fabric, resulting in that the metallic glossy generated by the metallic film becomes shaded and uneven. Further, the metallic film is adversely influenced by the carbon fibers used as the reinforcing material in the inner layer, so that metallic glossy is unavoidably blackened and muddied. Therefore, the sufficient ornamental or decorative effect cannot be produced due to these arrangement.

SUMMARY OF THE INVENTION

The present invention was made in order to solve the above-mentioned problems.

An object of the present invention is to provide a hollow cylindrical member in which a main body thereof is prevented from being damaged and worn out and the separation between layers are also prevented to thereby enhance strength and durability of the hollow cylindrical member.

Another object of the present invention is to provide a hollow cylindrical member in which a metal film or member provided therein produces sufficient metallic glossy effect to improve ornamental or decorative property.

In order to attain the above-noted and other objects, the present invention provides a hollow cylindrical member which comprises: a first layer made of synthetic resins and reinforcing fibers; and a second layer made of synthetic resins and provided with metallic member, the second layer circumscribing the first layer with the metallic member being in non-contact with the first layer.

The metallic member may be a net-like thin metal member embedded in the second layer.

Alternatively, the metallic member may be a thin metallic film bonded onto one surface of the second layer, which surface is opposite to the other surface thereof bonded to the first layer.

The present invention further provides a hollow cylindrical member which comprises: an inner layer formed of fiber-reinforced resins; an intermediate layer wound and formed onto an outer periphery of the inner layer and made mainly of fiber-reinforced resins utilizing glass fibers as reinforcing fibers and having a thin metallic film provided on an outer surface thereof; and an outer layer integrally wound and formed onto an outer periphery of the intermediate layer and made of fiber-reinforced resins utilizing as reinforcing fibers glass fibers which are arranged in parallel relation to each other in a longitudinal direction of the hollow cylindrical member.

The present invention further provides a hollow cylindrical member which comprises: a main body formed of a wound preimpregnation sheet made of high-strength fibers impregnated with synthetic resins; and a net-like thin metallic member having a number of openings, which is wound onto an outer periphery of the main body.

DETAILED DESCRIPTION OF THE PREFERRED EMBODIMENTS

Figure 1:
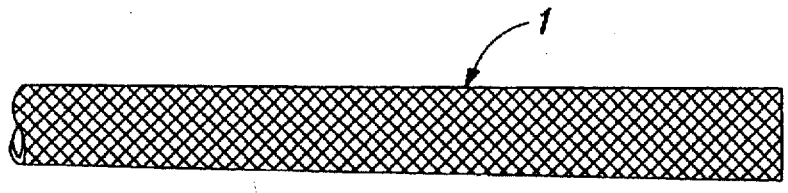
FIG. 1 is a side view showing a hollow cylindrical member according to a first embodiment of the present invention.
Figure 2:
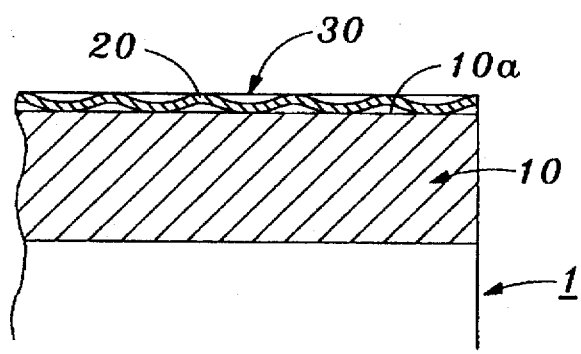
FIG. 2 is a cross-sectional view showing a major part of the hollow cylindrical member shown in FIG. 1.

Preferred embodiments of the present invention will now be described in detail with reference to the drawings attached hereto.

FIGS. 1 to 4 show a hollow cylindrical member according to a first embodiment of the present invention. In the drawings, reference numeral 10 designates a main body of the hollow cylindrical member 1.

Figure 3:
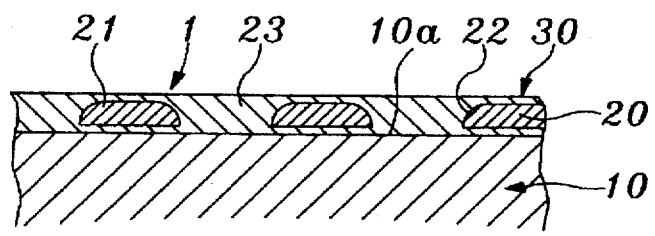
FIG. 3 is an enlarged cross-sectional view of FIG. 2.
Figure 4:
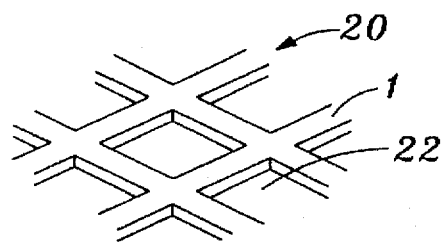
FIG. 4 is a perspective view showing a net-like metallic member having a number of opening, which is used in the hollow cylindrical member shown in FIG. 1.

The main body 10 is formed by winding a preimpregnation material which is made of high-strength fibers such as carbon fibers, glass fibers and aramid fibers impregnated with synthetic resins such as epoxy resins, phenol resins and polyester resins. A reinforcing layer 30 is integrally provided on the outer periphery 10a of the main body 10 by winding a sheet material 20 made of synthetic resins 23 containing therein a net-like metallic member 21 as a reinforcing material. As shown in FIG. 3, the metallic member 21 has a front surface portion with shorter width and a rear surface portion with longer width, which are adjoined with each other through a tapered edge defining openings 22. The sheet material 20 is wound on the outer periphery 10a of the main body 10 such that the rear surface portion of the metallic member 21 is confronted with the outer periphery 10a of the main body 10.

The net-like thin metallic sheet 21 is formed such that a number of openings are formed through a metallic plate having relatively thin thickness, and the metallic plate with openings is thereafter subjected to an elongation and a surface processing. As for the raw material of the metallic member, for example, titanium, SUS, iron, aluminum or the like can be used. The metallic member with 20–200 μm thickness and 0.5–2.5 mm opening dimension is preferable.

A manufacturing process of the thus constructed embodiment is hereafter described.

A mandrel is provided, so that a preimpregnation material sheet made of high-strength fibers such as carbon fibers, glass fibers and aramid fibers impregnated with synthetic resins such as epoxy resins, phenol resins and polyester resins is wound onto the mandrel to form the main body 10 of the hollow cylindrical member 1.

Thereafter, the sheet 20 made of synthetic resins 23 having the net-like thin metallic member 21 embedded therein as the reinforcing material is wound on the outer periphery 10a of the main body 10.

Then, a taping, a thermal curing, a mandrel removing, and a tape removing or peeling are performed along a usual practice. Through these processes, the hollow cylindrical member as shown in FIGS. 1 to 4 can be manufactured.

As noted above, according to the present invention, the sheet 20 in which the thin net-like metallic member 20 having a number of openings 22 is embedded in the synthetic resins 23 as the reinforcing material, is wound onto the hollow cylindrical member main body 10 formed of preimpregnation material made of the high-strength fibers impregnated with the synthetic resins, to thereby integrally form the reinforcing layer 30 onto the main body 10. Therefore, the reinforcing layer 30 protects the main body 10 from being damaged and worn as well as reinforces the main body 10, so that it is possible to provide a hollow cylindrical member improved in strength and durability.

Further, the reinforcing layer 30 is integrally formed on the outer periphery 10a of the main body 10 such that the synthetic resins 23 contains therein the net-like metallic member 21 having a number of openings. In the reinforcing layer 30, the synthetic resins flows sufficiently around the metallic member 21 through the openings 22 to improve adhesion therebetween and to increase a contact area between the main body 10 and the reinforcing layer 30. Therefore, the reinforcing layer 30 can be surely prevented from being peeled off from the main body 10, and the interface peeling between the metallic member 21 and the synthetic resins 23 can also be prevented, to thereby enable the provision of the hollow cylindrical member 1 improved in strength and durability.

Even if the hollow cylindrical member 1 is accidentally damaged or broken, the reinforcing layer 30 can prevent the complete separation of the hollow cylindrical member, so that there is no possibility that a user or ambient person is injured.

In a case where the hollow cylindrical member 1 is used for a frame member of a bicycle, the hollow cylindrical member 1 is not placed into a non-usable condition even if the hollow cylindrical member 1 is damaged, so that it is possible to prevent a terrible accident caused on a user.

Furthermore, a substantially funnel-like opening having a larger side and a smaller side is formed in the metal member 20 by the tapered or slanted portions which can be formed by a machining tool for punching process without a specific manner. When the metal member 20 is arranged such that the smaller side of the openings 22 are confronted to the outer periphery 10a of the main body 3 as shown in FIG. 3, the synthetic resins 23 is liable to flow radially outward through the openings 22 during processing, as a result of which the sheet 20 is made flat without any irregular portion, i.e. a recess or protrusion.

Yet further, the tapered or slanted portion of the net-like metallic member 20 produces a stereognostic feeling, so that the outer appearance of the hollow cylindrical member 1 is enhanced. In this case, it is preferable that the synthetic resins 23 becomes transparent after being thermally set.

Further, the metallic member 21 is embedded in the synthetic resins 23 and prevented from being brought into contact with the main body 10, so that the reinforcing layer 30 does not apply any adverse effect to the fibers in the hollow cylindrical member main body 10. In addition, even if some contact occurs between the metallic member 21 and the main body 10, it is possible for the present invention to ensure the sufficient bonding between the main body 10 and the reinforcing layer 30 and to prevent the damage applied to the fibers in the main body 10, owing to the plate-like configuration of the metallic member 21 and the provision of the openings 22.

Still further, since the metallic member 21 is embedded in the synthetic resins 23, the metallic member is protected from corrosion, as a result of which various metallic materials can be utilized for the metallic member 21.

In the present invention, it is preferable that the synthetic resins 23 of 30–80 volume % in comparison with the metallic member 21 are used so as to embed the net-like thin metal member 21 therein.

Figure 5:
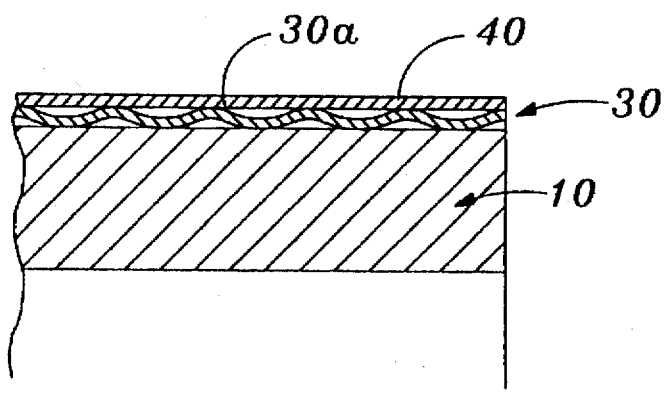
FIG. 5 is a cross-sectional view showing a hollow cylindrical member according to a second embodiment of the present invention.

FIG. 5 shows a hollow cylindrical member according to a second embodiment of the present invention, in which an outer surface layer 40 is provided on an outer periphery 30a of the reinforcing layer 30 of the aforementioned first embodiment.

The outer surface layer 40 is transparent, through which the reinforcing layer 30 can be viewed from outside.

The outer surface layer 40 is molded, for example, by using glass fibers or organic fibers, and is made transparent after it is molded. It is preferable to use a woven fabric in which a large amount of fibers are arranged in circumferential direction. It is preferable to use a one-direction paralleled fiber sheet in which reinforcing fibers are arranged in parallel relation to each other.

According to the second embodiment, in addition to the effects produced by the first embodiment, a net-like thin metallic member 21 contained in the reinforcing layer 30 can be viewed from the outside through the transparent outer surface layer 40.

Figure 6:
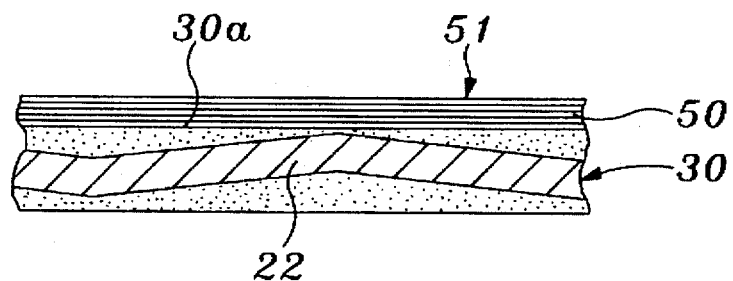
FIG. 6 is a cross-sectional view showing a hollow cylindrical member according to a third embodiment of the present invention.

FIG. 6 shows a hollow cylindrical member according to a third embodiment of the present invention, in which an outer surface layer 51 is provided on the outer periphery 30a of the reinforcing layer 30 of the first embodiment, the outer surface layer 51 being formed of a thin preimpregnation material sheet 50 made of high-strength fibers such as carbon fibers, glass fibers and aramid fibers impregnated with synthetic resins such as epoxy resins, phenol resins and polyester resins.

The preimpregnation sheet 50 is not greater than 0.1 mm in thickness, and it is preferable to have 0.01–0.03 mm thickness.

According to the third embodiment, since the outer surface layer 51 formed of the thin preimpregnation material sheet 50 is provided onto the outer periphery 30a of the reinforcing layer 30, the movement of the net-like thin metallic member 21 due to the influence of the flow of the synthetic resins can be restricted or regulated during a thermal processing, so that these layers are integrated with each other without any irregular portions such as projected or recessed portions.

In the third embodiment, the thin preimpregnation material sheet 50 is provided only on the outer periphery 30a of the reinforcing layer 30, but may be provided on both inner and outer periphery of the reinforcing layer 30 or on the outer periphery 30a with the reinforcing layer 30 interposed between the thin preimpregnation material sheet 50 and the main body 10.

In these embodiments, the reinforcing layer 30 is formed by winding onto the main body 10 the sheet 20 in which the thin metallic member 21 having a number of openings 22 is embedded in the synthetic resins 23 as a reinforcing material, but the present invention should not be restricted thereto or thereby. For example, the reinforcing layer 30 may be formed by winding onto the main body 10 a tape in which a thin metallic member 21 having a number of openings 22 is embedded in synthetic resins 23 as a reinforcing material. In this case where the tape is used, it is preferable that the tape is spirally and closely wound onto the main body 10 with adjacent edges of the tape being adjoin with each other.

Further, in the present invention, in order to prevent the adhesion or close contact between the reinforcing fibers in the hollow cylindrical member main body and the metallic member in the reinforcing layer, it is possible to increase the synthetic resins of the reinforcing layer in thickness, interpose a different kind of preimpregnation material between the main body and the reinforcing layer, use different kinds of matrix resins for the reinforcing layer and the main body, or wind and form the reinforcing layer after the main body is molded.

The hollow cylindrical member according to the present invention is suitable for sporting goods such as a fishing rod, a golf shaft, a bicycle frame or the like.

Figure 7:
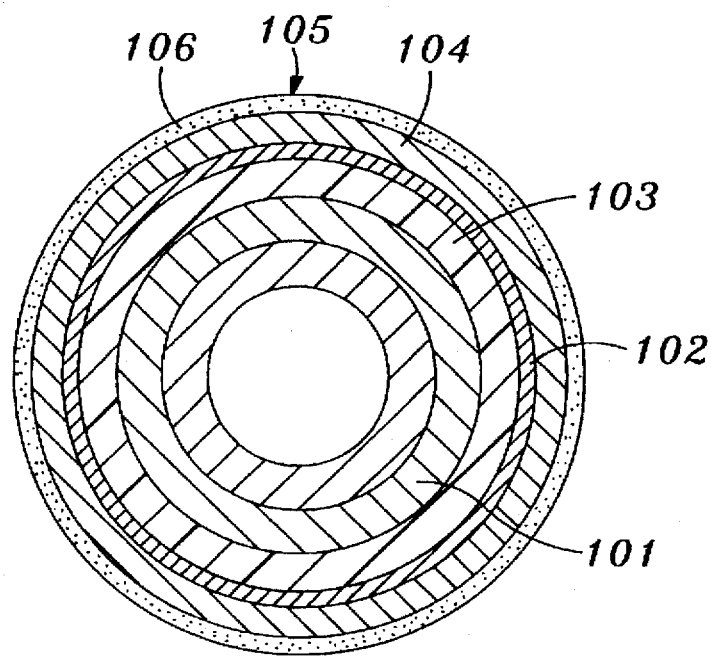
FIG. 7 is a transverse cross-sectional view showing a hollow cylindrical member according to a fourth embodiment of the present invention.
Figure 8:
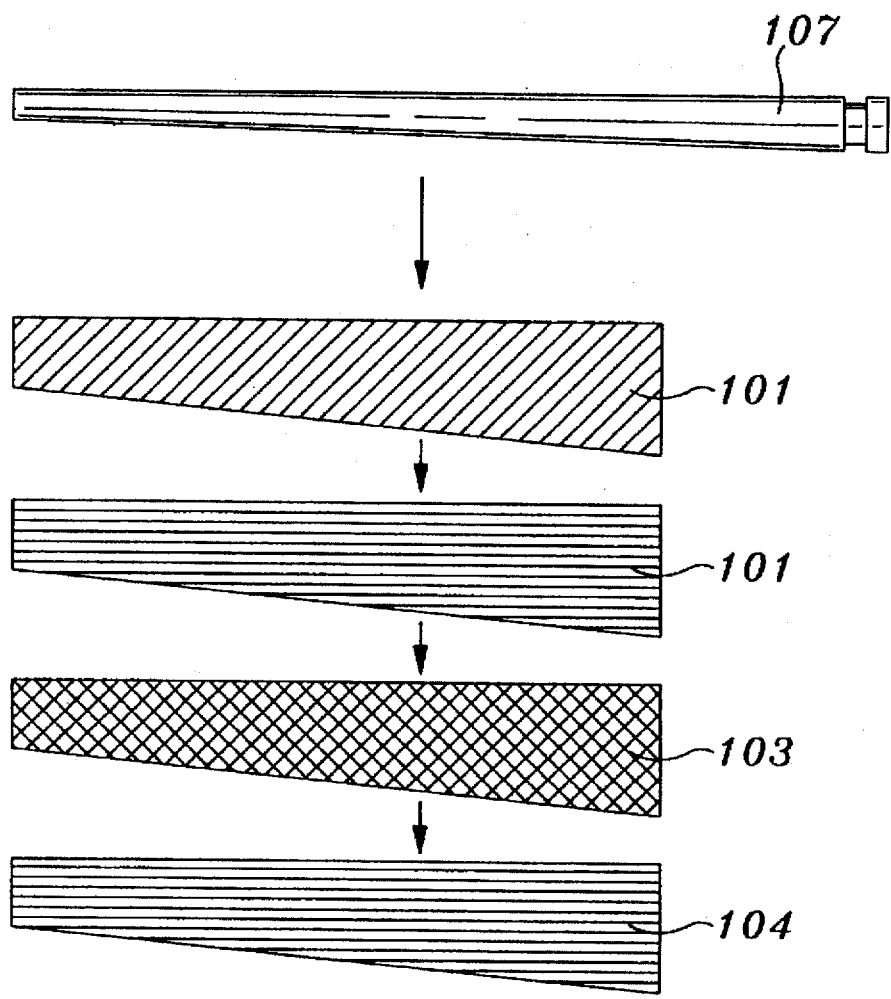
FIG. 8 is an explanatory view of a manufacturing process for the hollow cylindrical member shown in FIG. 7.
Figure 9:
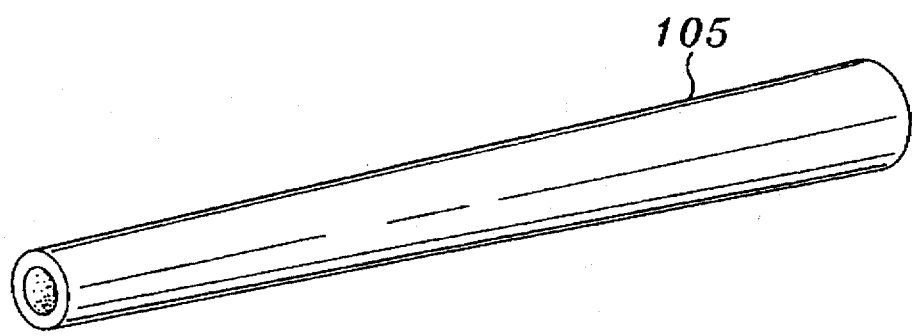
FIG. 9 is a perspective view showing the hollow cylindrical member shown in FIG. 7

FIGS. 7 to 9 show a hollow cylindrical member 105 according to a fourth embodiment of the present invention. The hollow cylindrical member 105 includes inner layers 101 and 101 each formed of a wound preimpregnation material made of reinforcing fibers such as carbon fibers, glass fibers and aramid fibers impregnated with thermally curing synthetic resins such as epoxy resins, phenol resins and polyester resins, an intermediate layer 103 integrally wound and formed onto an outer periphery of the inner layer 101 and made mainly of fiber-reinforced resins utilizing a glass fiber woven fabric as reinforcing fibers and having a thin metallic film 102 integrally formed on an radially outer surface thereof, and an outer, layer 104 integrally wound and formed onto an outer periphery of the intermediate layer 103 and made of fiber-reinforced resins utilizing longitudinally and parallelly arranged glass fibers as reinforcing fibers.

An amorphous or crystal metal of titanium, tungsten or the like is applied to the intermediate layer 103 through a vacuum evaporation process such as sputtering, a plating process or the like to form the thin metallic film 102 of 1 μm thickness or around which is integrally and securely adhered to or provided on the outer surface of the intermediate layer 103. In addition, a paint film or layer 106 made of a transparent or light-transmissible paint may further be formed on an outer surface of the outer layer 104.

The hollow cylindrical member 105 is manufactured as follows: As shown in FIG. 8, preimpregnation material sheets forming inner layers 101, a preimpregnation material sheet having the thin metallic film at one side thereof and forming the intermediate layer 103, and a preimpregnation material sheet forming the outer layer 104 are wound onto a mandrel 107 in this order. Thereafter, this assembly of the preimpregnation material sheets and the mandrel is subjected to taping and thermal curing processes, and then to mandrel removing, tape peeling and grinding processes or the like. Thereafter, the hollow cylindrical member is painted to form the paint film or layer 106. In addition, colored paint may be partially applied to a surface of the paint layer 106 of the member 105 so that the metallic gloss partially appears to form a pattern or design.

In the fourth embodiment as constructed above, the thin metallic film 102 provides the clear metallic glossy to the hollow cylindrical member without shade and color unevenness. Further, since the intermediate layer 103 is integrated with the inner layer 101 without the metallic film 102 being in contact with the inner layer 101, so that the metallic glossy generated from the metallic film 102 is prevented from being blackened due to an influence of the color tone of the inner layer 101. Therefore, in a case where the hollow cylindrical member of the present invention is applied to the golf shaft, the fishing rod, the bicycle frame, the ski stock or the like, it is possible to enhance the ornamental or decorative effect thereof while improving hardness, strength and impact-resistance thereof. Further, if the intermediate layer is formed of a glass-fiber woven fabric impregnated with the synthetic resins, the color tone of the inner layer is shaded by intersecting points of the woven glass fibers, so that the ornamental or decorative effect of the thin metallic film can be further enhanced. Similarly, if the intermediate lay is formed of a material which becomes white or the like after being set, the decorative or ornamental effect can be further expected.

In the fourth embodiment, in order to generate the metallic glossy from a hollow cylindrical member which is mainly made of synthetic resins, a thin metallic film is adhered to or provided on an outer surface of an intermediate layer utilizing a glass-fiber woven fabric as a reinforcing material, and the thin metallic film is covered with an outer layer utilizing as reinforcing material glass fibers which are arranged in a parallel relation with each other in a longitudinal direction of the hollow cylindrical member. Therefore, the thin metallic film is neither obstructed by fiber intersecting points of the glass-fiber woven fabric nor adversely effected by the color tone of an inner layer. Further, the metallic member in the fourth embodiment is a thin metallic film, so that the metallic glossy can be generated from the hollow cylindrical member without large increase in weight.

What is claimed is:

1. A hollow cylindrical member comprising:

an inner layer formed of a fiber-reinforced resin, said layer being formed of carbon fibers defining a color;

an intermediate layer wound and formed onto an outer periphery of said inner layer and made mainly of a fiber-reinforced resin utilizing glass fibers as reinforcing fibers, said fibers being arranged to intersect one another;

a thin metallic film provided on an outer surface of said intermediate layer opposite from said inner layer; and an outer layer integrally wound and formed onto an outer periphery of said thin metallic film and said intermediate layer and made of a fiber-reinforced resin utilizing as reinforcing fibers glass fibers which are arranged in parallel relation to each other in a longitudinal direction of said hollow cylindrical member.

2. The hollow cylindrical member according to claim 1, wherein said glass fibers in said intermediate layer are in the form of woven fabric.

3. The hollow cylindrical member according to claim 1, wherein said thin metallic film is made of an amorphous metal.

4. The hollow cylindrical mender according to claim 1, wherein said thin metallic film is made of a crystal metal.

5. The hollow cylindrical member according to claim 1, wherein said thin metallic film is formed by vacuum-evaporating a metal onto said glass fibers of said intermediate layer.

6. The hollow cylindrical member according to claim 1, wherein said thin metallic film is formed by plating a metal onto said glass fibers of said intermediate layer.

7. The hollow cylindrical member according to claim 1, wherein said thin metallic film has 1 μm thickness.

8. The hollow cylindrical member according to claim 1, further comprising a transparent paint layer provided around said outer layer.

* * * * *